United States Patent [19]

Newman et al.

[11] 4,215,801
[45] Aug. 5, 1980

[54] VENDING MACHINE VALVE STRUCTURE

[75] Inventors: Alec T. Newman; David Rhodes, both of Banbury, England

[73] Assignee: General Foods Limited, Banbury, United Kingdom

[21] Appl. No.: 854,243

[22] Filed: Nov. 23, 1977

[30] Foreign Application Priority Data

Dec. 1, 1976 [GB] United Kingdom ............... 50171/76

[51] Int. Cl.² ............................................. B67D 5/44
[52] U.S. Cl. ................................... 222/63; 222/129.4; 222/452; 221/96
[58] Field of Search ................... 222/63, 129.1–129.4, 222/305, 434, 444, 449–452, 476; 194/1 A, 1 B, 3, 13; 141/164, 171, 173, 174; 221/10, 11, 96, 103–105, 119–121; 417/317, 442

[56] References Cited

U.S. PATENT DOCUMENTS

| | | | |
|---|---|---|---|
| 513,803 | 1/1894 | Luster | 222/452 X |
| 1,285,206 | 11/1918 | Johnson et al. | 222/452 X |
| 2,732,980 | 1/1956 | Öholm | 222/452 X |
| 2,742,201 | 4/1956 | Hartley | 222/452 X |
| 2,852,043 | 9/1958 | Cooper | 221/96 X |
| 2,888,165 | 5/1959 | Bookout et al. | 221/77 |
| 4,102,477 | 7/1978 | Yoon | 222/452 X |

FOREIGN PATENT DOCUMENTS

| | | | |
|---|---|---|---|
| 2102729 | 8/1971 | Fed. Rep. of Germany | 222/305 |
| 2102729 | 8/1971 | Fed. Rep. of Germany | 222/305 |
| 1541368 | 8/1968 | France | 222/451 |

*Primary Examiner*—Joseph J. Rolla
*Attorney, Agent, or Firm*—Kenyon & Kenyon

[57] ABSTRACT

The invention provides a valve for dispensing material from a hopper. The valve comprises a body defining a passage way, a generally L-shaped valve member pivotally mounted to one side of the passageway such that the inner faces of the arms of the valve member can engage respective ones of a pair of spaced back to back valve seats disposed in the passageway so that in use with the downstream of the two arms closing the passageway by engaging the downstream valve seat a charge of material in the hopper can be received between the two arms and dispensed when the valve member is rotated to open the passageway by the downstream arm and subsequently close it by the upstream arm engaging the upstream valve seat, flow through the passageway being substantially obstructed by the upstream arm as the valve member is returend to close the passageway by the downstream arm.

19 Claims, 15 Drawing Figures

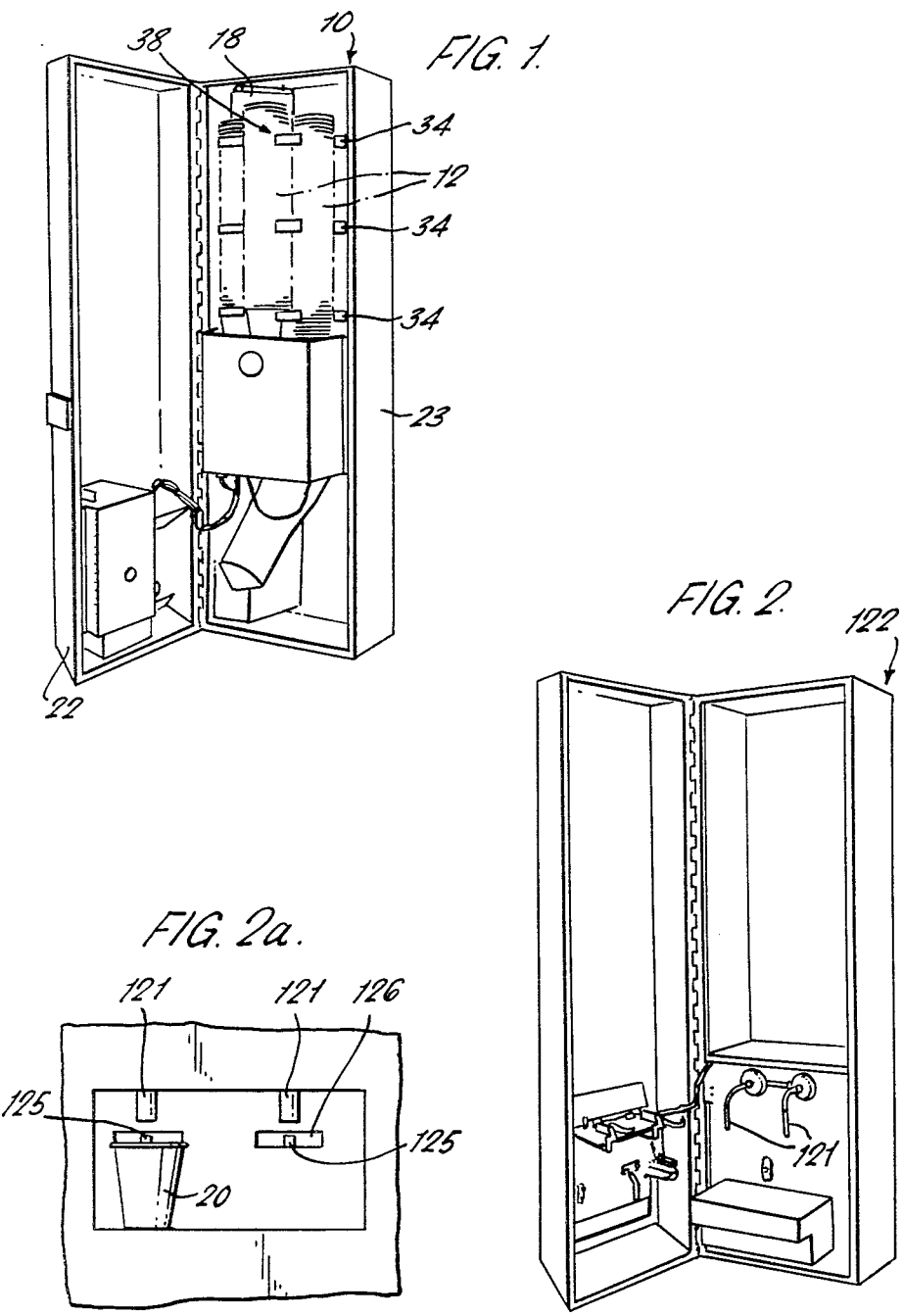

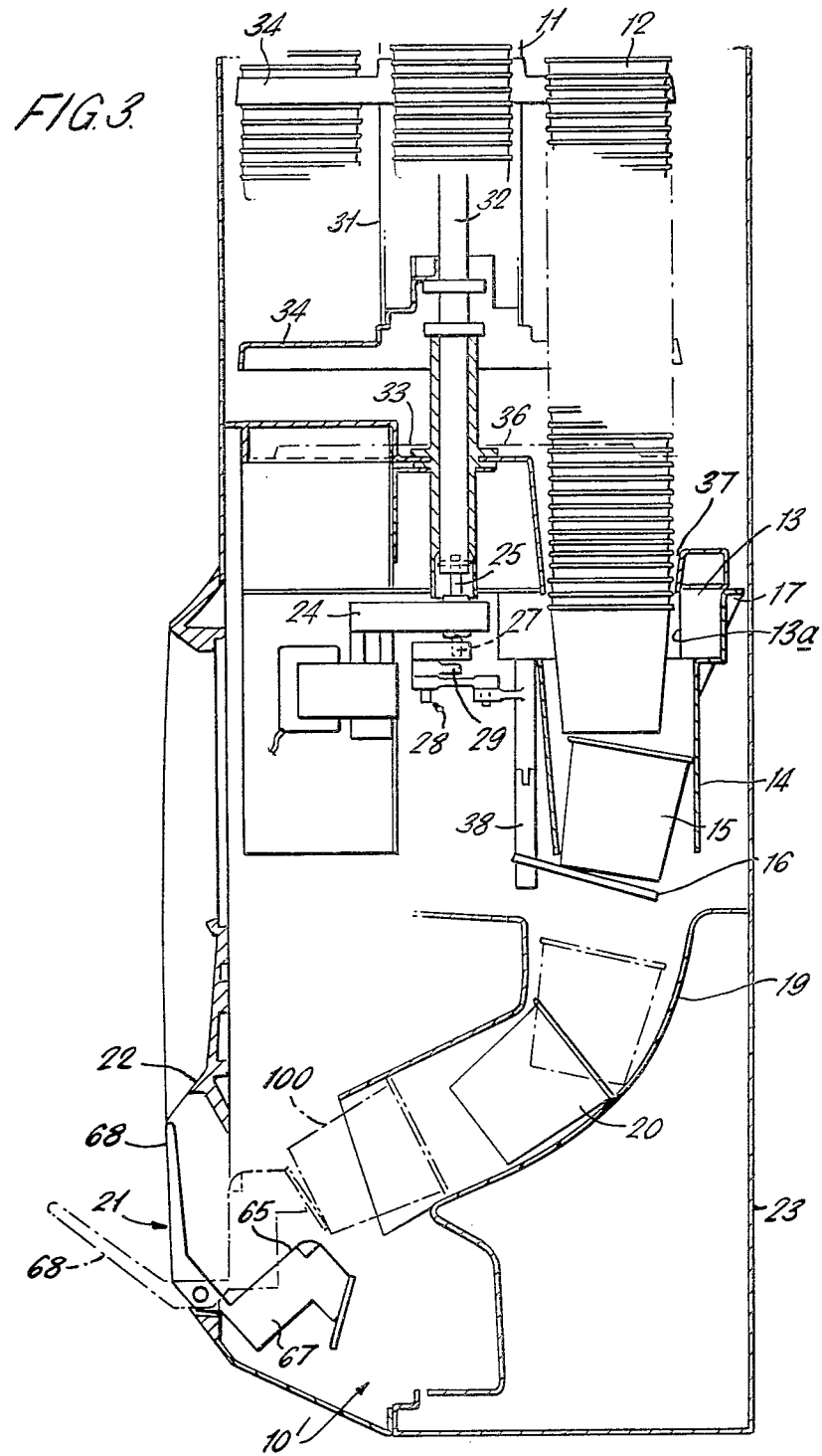

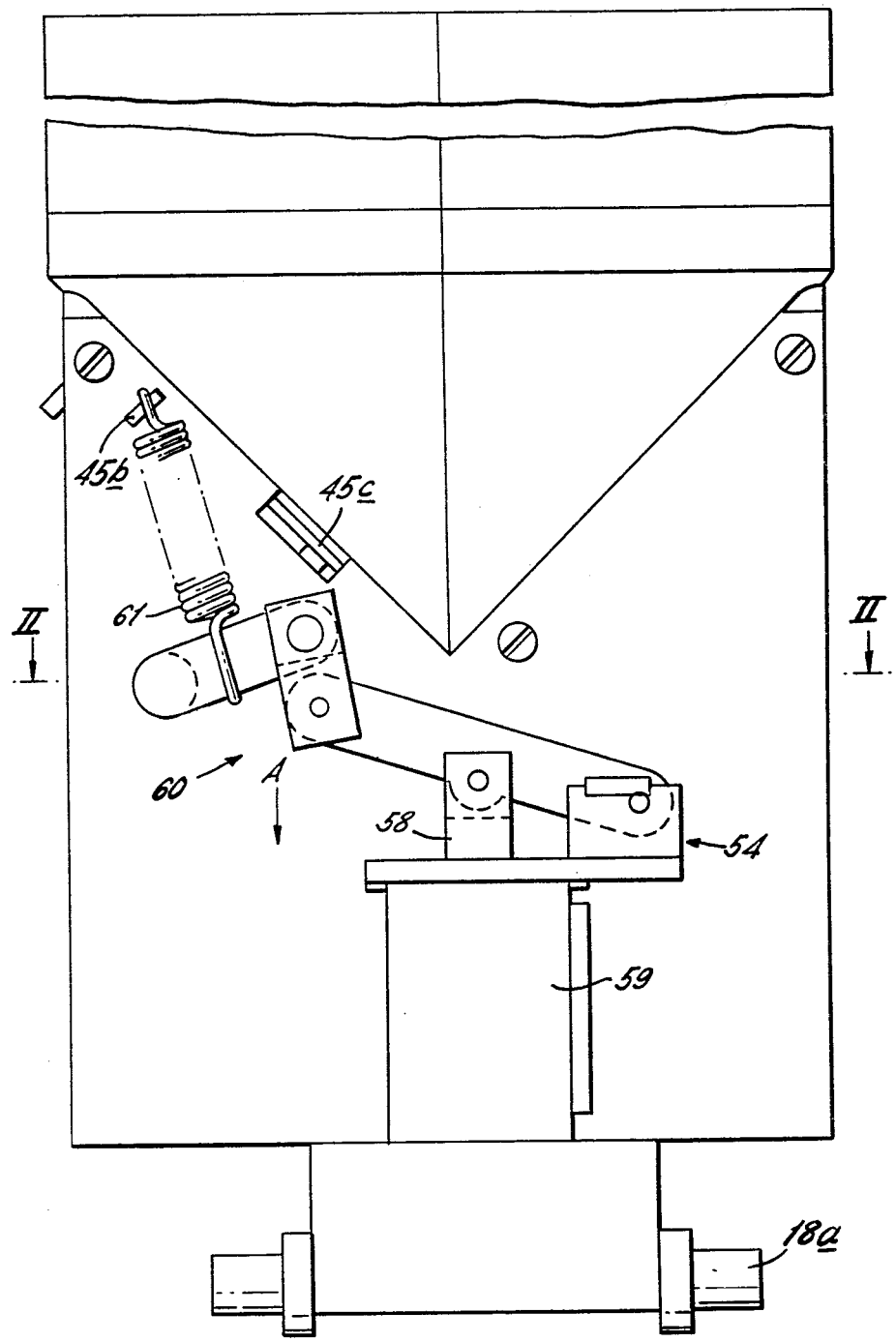

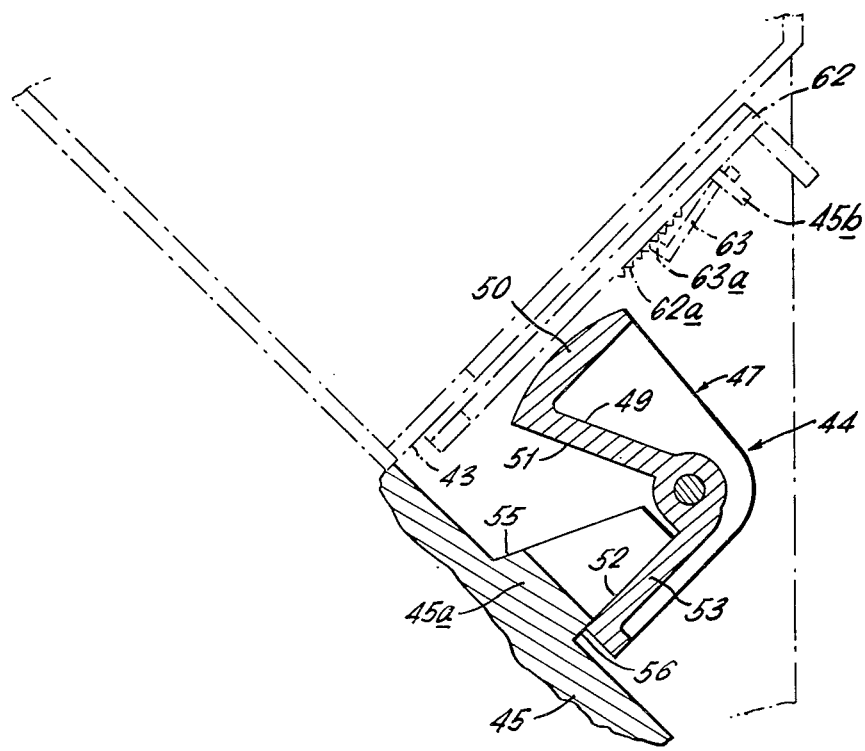
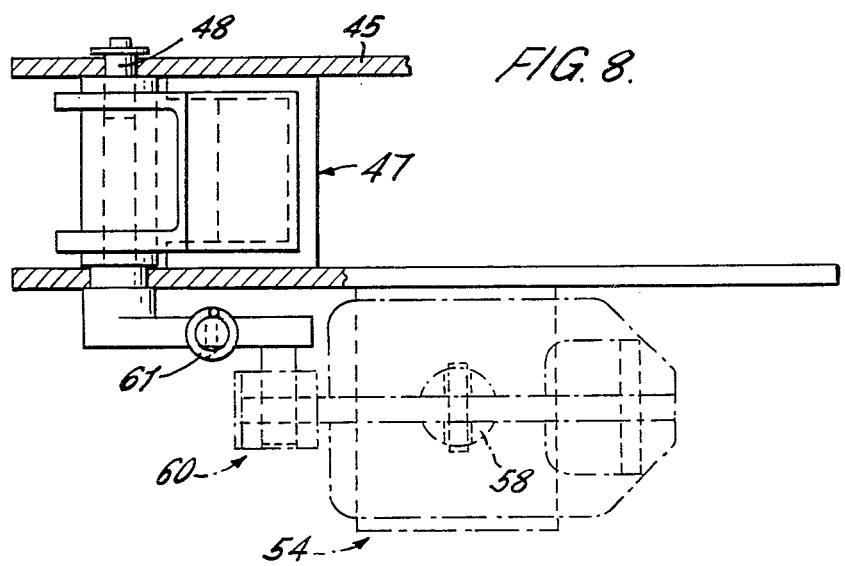

VENDING MACHINE VALVE STRUCTURE

This invention relates to valves and vending apparatus incorporating such valves.

According to the present invention there is provided a valve for controlling the dispensing of material from a hopper comprising:
means defining a passageway;
a valve member having two angularly spaced valve elements;
means for pivotably mounting the valve member about an axis on the means defining a passageway on one side of the passageway such that the two valve elements are spaced around the pivotal axis of the valve member; and means defining a pair of oppositely facing valve seats spaced along the passageway, the upstream one of which faces upstream along the passageway and the downstream one of which faces downstream along the passageway, the elements being capable of alternately closing the passageway by engaging a respective valve seat according to the rotational position of the valve member, so that, in use, with the downstream of the two elements closing the passageway by engaging the downstream valve seat, a charge of the material in the hopper can be received between the two elements and dispensed when the valve member is rotated to open the passageway by the downstream element and subsequently close it by the upstream element engaging the upstream valve seat, flow through the passageway being substantially obstructed by the upstream element as the valve member is returned to close the passageway by the downstream element.

Specific embodiments of the invention will now be described with reference to and as illustrated in the accompanying drawings, in which:

FIG. 1 is a perspective view of a cup and ingredient vending apparatus with its door open;

FIG. 2 is a perspective view of water supply apparatus with its door open;

FIG. 2a is a front view of a detail of the water supply apparatus of FIG. 2;

FIG. 3 is a sectional view of the vending apparatus of FIG. 1 with its door closed;

FIG. 6 is a view of the other side of the dispenser of FIG. 4;

FIG. 7 is a partial sectional view of FIG. 4 along the line I—I with a valve element in its closed position;

FIG. 8 is a partial sectional view along the line II—II in FIG. 6;

Figure 4:
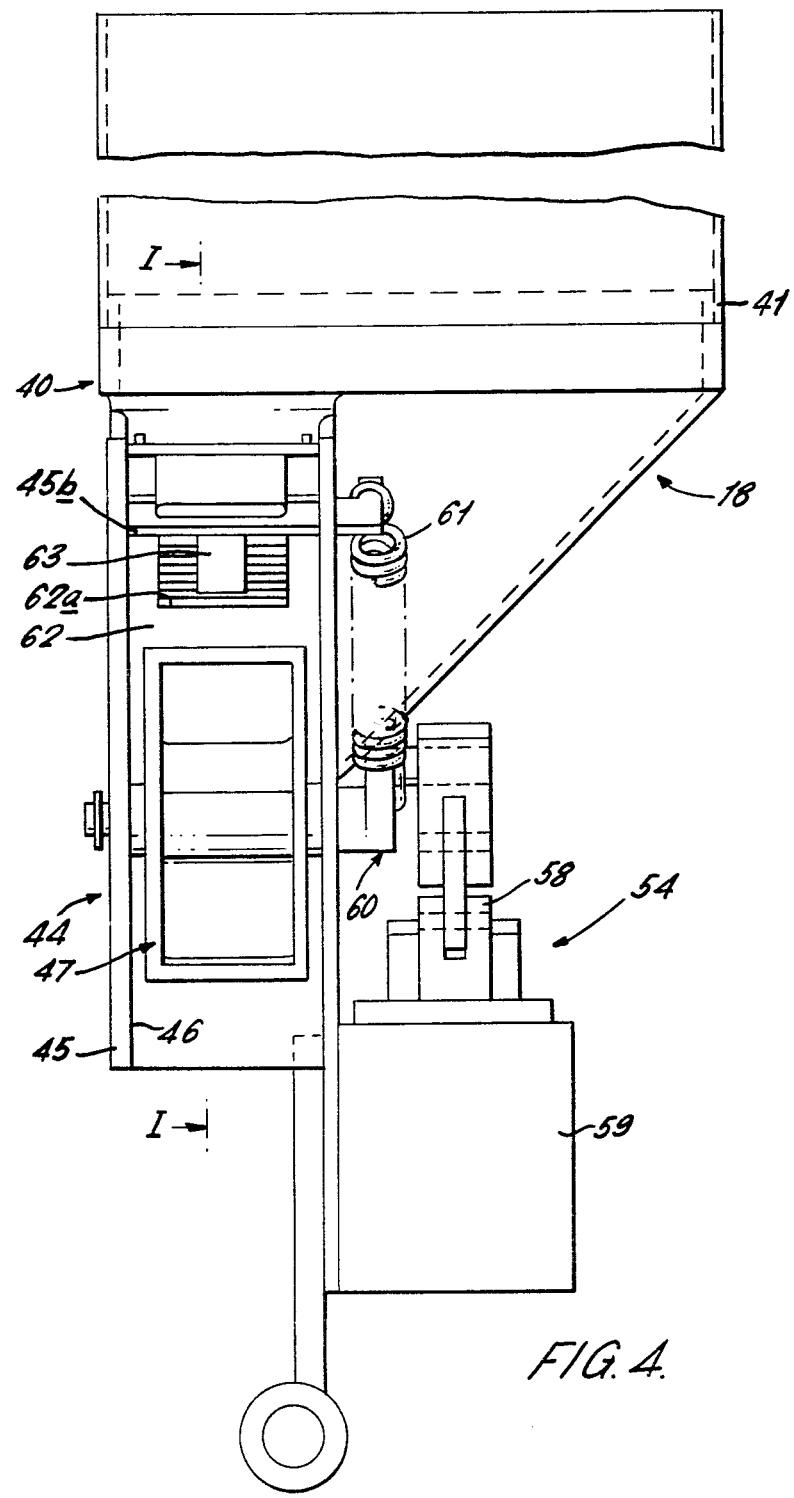
FIG. 4 is a front view of a material dispenser of the vending apparatus of FIG. 1.
Figure 5:
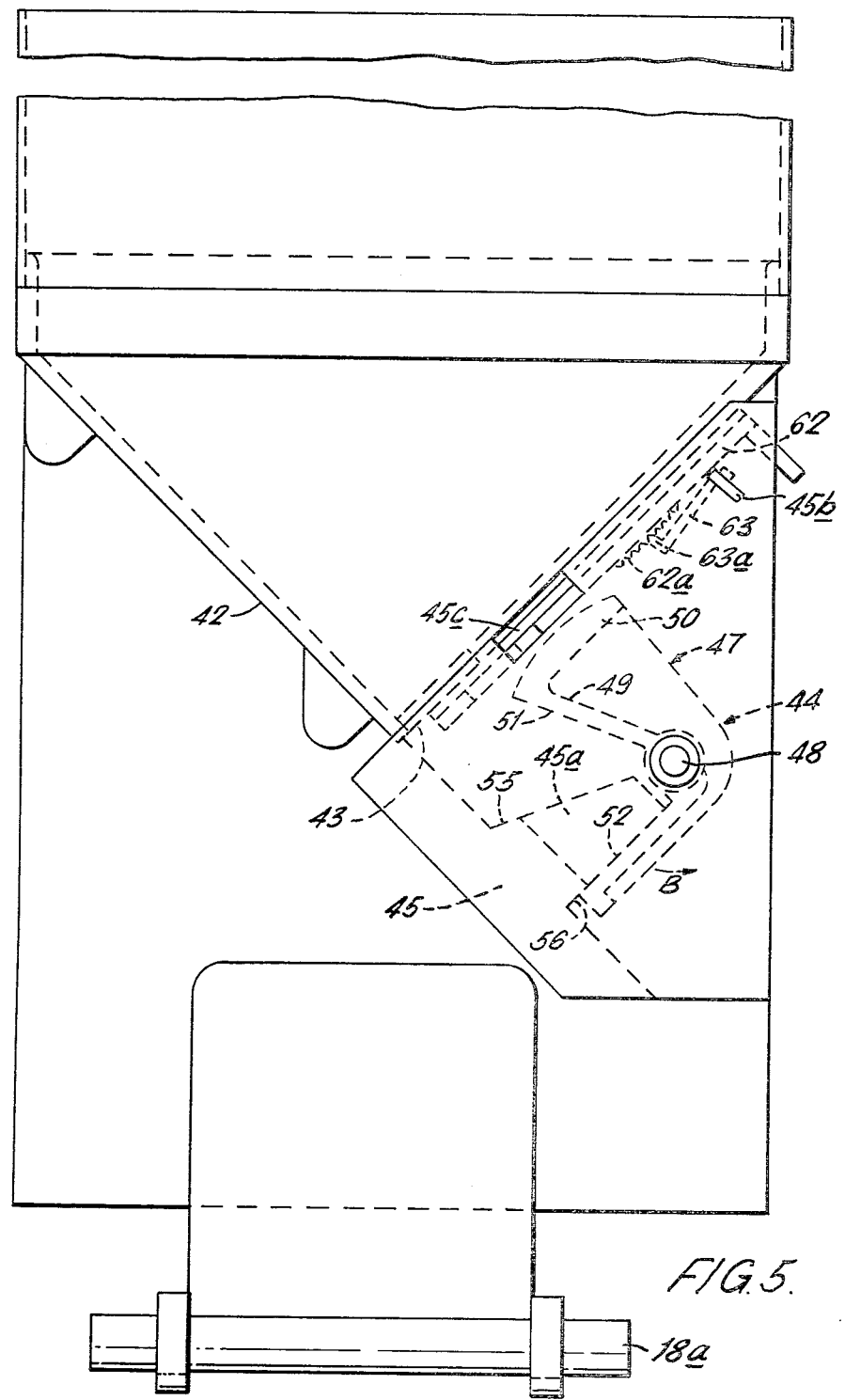
FIG. 5 is a view of one side of the dispenser of FIG. 4.
Figure 9:
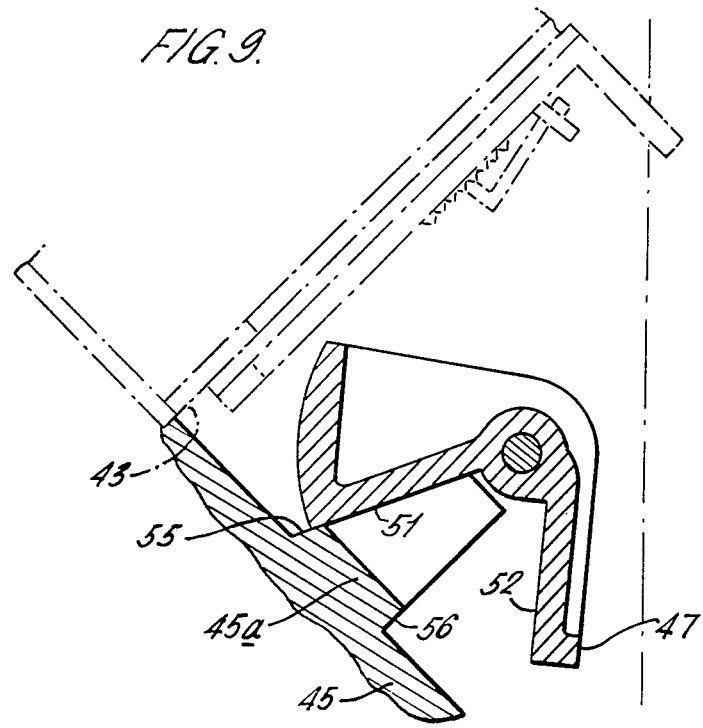
FIG. 9 is a sectional view of FIG. 4 generally along line I—I with the valve element in its 'material delivered' position.

FIGS. 1 and 3 show a vending apparatus generally indicated at 10 which comprises a rotatable turret 11 arranged to retain five columns of cups generally indicated at 12, a conventional cup dispensing unit 13 disposed below a cup-delivery position of the turret 11 and operable to deliver individual cups sequentially from a column of cups in the delivery position, a generally cylindrical guide 14 disposed coaxially with and beneath the cup dispensing mechanism 13 to guide dispensed cups 15, a sloping interrupting blade 16 for temporarily retaining each dispensed cup 15 within the guide 14 and for orientating the mouth of each cup 15 towards an ingredient delivery shute 17, a dry material or ingredient dispenser 18 (the top of which is shown in FIG. 1) having an outlet in communication with the delivery chute 17, a guide chute 19 for defining the path of travel of a cup 20 which has been released by the interrupting blade 16 and a hinged cup discharge unit 21 which in a first position (shown in solid line) receives a cup 20 from the guide chute 19 whilst preventing customer access to the chute 19 and which in a second position (shown in broken line) makes the cup 20 available to the customer whilst continuing to prevent customer access to the guide chute 19. Each of the above components is mounted within a lockable cupboard comprising a hinged door 22 and body 23.

The cup dispensing mechanism 13 is preferably of the type (known per se) which comprises a plurality of pinions arranged around a circular aperture 13a through which the cups pass, each of which engages a respective rack portion formed on the inside of a ring which is mounted coaxially with the aperture for oscillatory motion about the common axis, each of the pinions being formed with a pair of axially spaced and circumferentially staggered detents which are arranged such that the dispensing mechanism releases a single cup for each cycle of motion of the ring. The ring is oscillated by means of a lever. However, any appropriate dispensing mechanism may be used.

The vending apparatus 10 further comprises a first motor 24 arranged to rotatably drive the turret 11 by means of drive shaft 25 and a second motor 26 (see FIG. 10), one end of the drive shaft 27 of which can be seen in FIG. 3, which drives the interrupting blade 16 by means of a linkage 28 and the rotatable ring of the cup dispensing mechanism 13 by means of linkage 29, and a control cam 30 as described hereinafter.

The turret 11 comprises a vertical column 31 fixedly mounted on a rotatable shaft 32, which is itself rotatably mounted on chassis 33, which is releasably secured in the body 23. The vertical column 31 carries three axially spaced coaxial plates 34 having vertical aligned radially outwardly facing recesses 35 for transversely retaining columns of cups 12, the mouth of each recess 35 being dimensioned to allow the fingers of a person loading the cups 12 into the recesses 35, whilst retaining the cups 12.

The chassis 33 is formed with an upper surface 36, which extends beneath the lowermost plate 34 adjacent all but one of the columns of vertically aligned recess 35 to support any cups therein. The chassis 33 is formed with a vertically extending aperture 37, adjacent the remaining column of recesses 35 and coaxially with the aperture 13a, through which the cups in the remaining column may pass to be releasably retained by the cup dispensing mechanism 13.

Figure 10:
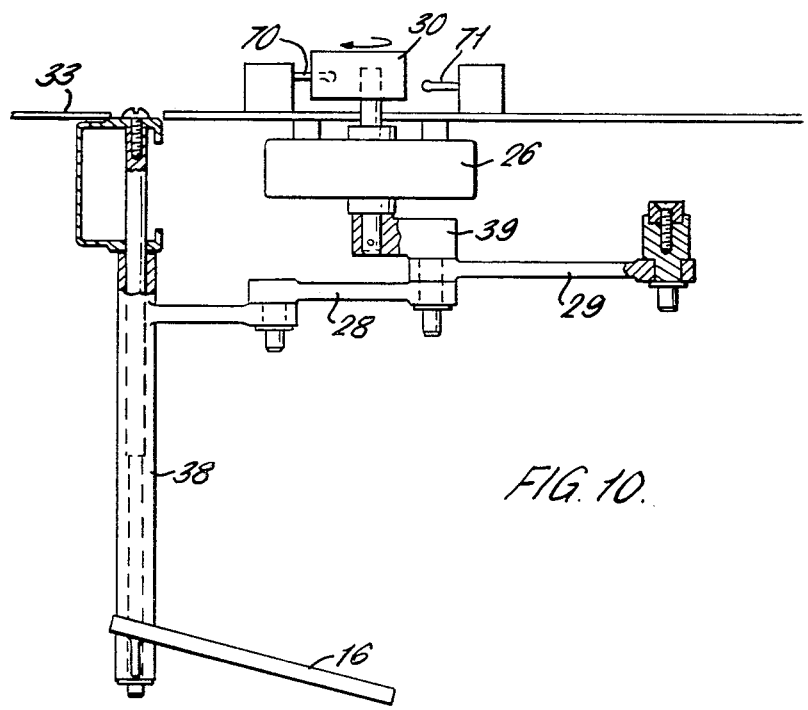
FIG. 10 is a side view of an interrupting blade and its associated drive of the vending apparatus of FIG. 1.
Figure 11:
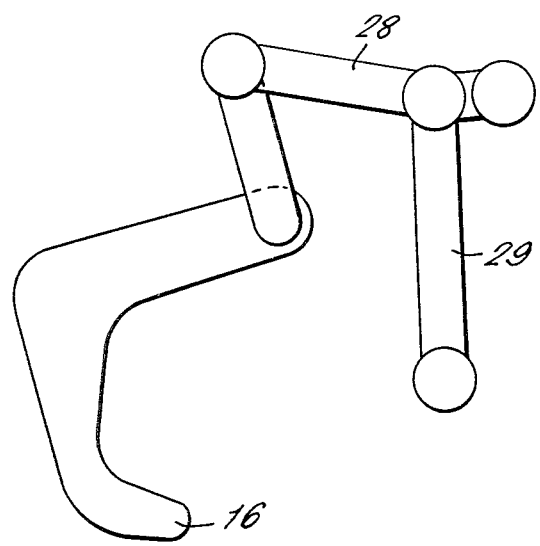
FIG. 11 is a schematic view from below of the interrupting blade and its associated drive.
Figure 12:
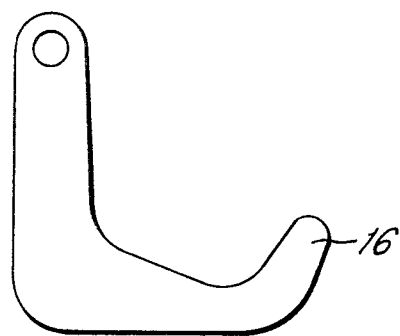
FIG. 12 is a view from below of the interrupting blade.

Referring to FIGS. 10 to 12, the interrupting blade 16 is generally sickle shaped and is mounted on a shaft 38, which is itself rotatably mounted on the chassis 33 and which is connected to the drive shaft of motor 26 via linkage 28 and eccentric 39. Linkage 29 is connected to the operating lever (not shown) of the cup dispensing mechanism 13.

Referring to FIGS. 4 to 9, the particulate dry material dispenser 18 comprises a reservoir 40 having a triangular cross-section elongate portion 41, a hopper portion 42 with an outlet 43, which faces at 45° to the axis of the elongate portion 41, and a valve mechanism 44 disposed adjacent the outlet 43 and being arranged to dispense a predetermined amount of the particulate dry ingredient.

The valve mechanism 44 has a body 45 defining a flow channel or passageway 46. A generally L-shaped valve member 47 is rotatably mounted on the body 45 about the intersection of its arms by means of a shaft 48, which extends transversely to the flow path defined by channel 46. The upstream arm 49 of the valve member is itself generally L-shaped with its short arm 50 extending from its free edge. The inwardly facing faces 51 and 52 of its upstream arm 49 and its downstream arm 53 together define a V-shaped space. The body 45 is formed with a projection 45a which extends around the internal periphery of the channel 46 to define a pair of valve seats 55 and 56 for arms 51 and 53 respectively. The valve seats 55 and 56 are in back to back relationship and spaced along the flow path defined by channel 46.

The shaft 48 is connected to an actuating mechanism 54 comprising a magnetic core 58 and an electromagnetic coil 59, by means of a linkage 60. A spring 61 extends between the linkage 60 and one end of an elongate member 45b which is mounted on the body 45a extending across channel 46, to bias the linkage 60 into the position shown in FIG. 6 and hence maintains face 52 of the downstream arm 53 against its valve seat 56 to obturate the flow channel 46. Energisation of the coil 59 causes the core 58 to be moved in the direction of the arrow A (see FIG. 6), which moves the linkage 60 against the action of spring 61 causing the valve member 47 to rotate in the direction of the arrow B (see FIG. 5), opening the flow channel or passageway 46 and allowing the dry particulate material to flow out of the channel 46 to the chute 17. As the valve member 47 continues to rotate the face 51 of the upstream arm 49 engages valve seat 55 interrupting the flow of dry particulate material (see FIG. 9). When the coil 59 is deenergised the spring 61 returns the valve member 47 to the position shown in FIG. 5. During the return of the valve member 47, arm 49, and in particular its arm 50, tends to sweep sugar away from the body 45a and substantially obstructs flow through the passageway 46. The spring 61 is arranged such that the face 52 of arm 53 engages valve seat 56 before the flow of dry particulate material has reached the valve seat 56, thus avoiding the necessity of closing the valve 44 against the flow of ingredient after the required amount of ingredient has been dispensed.

As the angle of settlement of any given dry particulate material is a constant for any given slope of support and dimension of outlet 43 and as the time taken for the arm 51 to engage the valve seat 55 is a constant for any given dry particulate material, the charge of material or ingredient dispensed per activation of the valve 44 is a constant.

The size of this charge can be adjusted by varying the size of the outlet 43 by means of a plate 62, which is slidably mounted on the outlet face 42a of hopper portion 42. The plate 62 is slidably held against the hopper portion 42 by elongate member 45b and a further parallel elongate member 45c.

The bar 45b carries a downwardly extending projection 63, which is formed with a tooth 63a which projects towards the plate 62 to locate in one of a series of lateral grooves 62a formed on the outwardly facing face of plate 62, to maintain the plate 62 in a given position. The projection 63 is made of resilient material so that the tooth 63a can be deflected from one groove 62a to another to allow upward and downward movement of the plate 62. Upward movement of the plate 62 increases the effective size of the outlet 43, whilst downward movement decreases the effective size of outlet 43.

The dispenser 18 is pivotably mounted in the body 23 by means of a shaft 18a mounted at its lower end.

The vending apparatus 10 is most suitable for use with cups 12 of the type which are pre-packed with dry particulate ingredients such as instant coffee or instant coffee and instant milk. The dry material dispenser 18 is then filled with sugar, as a customer option. However the vending apparatus may also be used with empty cups and single ingredient beverages such as orange or lemon tea. In addition it is envisaged that further dispensers 18 could be provided so that a number of ingredients may be introduced into a cup in response to a customer request.

For the purposes of clarity the operation of the vending apparatus 10 will be described in conjunction with cups pre-filled with instant coffee or instant coffee and instant milk and a sugar option.

In operation the customer introduces a coin, or coins, into a slot or slots (not shown) of the vending apparatus and then pushes a respective button (not shown) on the door 22 of the apparatus 10 requesting either coffee or coffee with sugar. The sequential combination of these actions cause a control circuit (as described hereinafter) to make power available for supplying motors 24 and 26. Motor 26 is directly in circuit with the power supply, however inhibit means are provided for preventing the supply of power to motor 24. A microswitch (not shown) is provided in circuit with the motor 24 and its power supply (not shown). The microswitch (not shown) is arranged to open whenever the level of the column of cups 12 in aperture 37 falls below a predetermined level, say the level of surface 36. When the microswitch is closed the inhibit means (not shown) inhibits the supply of power to the motor 24. When the microswitch is open the inhibit means are cancelled and the motor 24 is actuated causing the turret 11 to rotate, until a further column of cups enters the aperture 37. A further microswitch detects when the column of cups 12 in aperture 37 falls below a second level. When this further microswitch opens due to an absence of cups 12 at the second level the power supply to the motor 24 and 26 are disabled until further cups 12 are loaded into the machine. When the apparatus 10 is in this condition, it indicates that it is sold out, by means (not shown).

When power is supplied to motor 26 in response to the customers' coins and item request the drive shaft 27 rotates, moving linkage 29, and hence activating cup dispensing mechanism 13 to dispense one cup 15 into guide 14. The cup 15 is caught by interrupting blade 16, which is being moved steadily outwardly in response to movement of linkage 28 by drive shaft 27. The angle of the face of and the movement of the interrupting blade 16 cause the cup 15 to tilt with its mouth facing chute 17. If the customer has requested sugar the coil 59 is activated and a charge of sugar flows down the chute 17 into the cup 15.

As the sugar is being dispensed the interrupting blade 16 is being moved outwardly and the bottom of the cup 15 slides down the blade 16 until it is released, whereupon it falls into guide chute 19 which guides the released cup 20 into a recess 65 defined by one arm 67 of the L-shaped cup discharge unit 21, which is in its solid line position (see FIG. 3). In this position the other arm 68 of the unit 21 closes the aperture 69 in the door 22 through which the cup must pass to become available to the customer. The customer then hinges the unit 21 into its broken line position (see FIG. 3) in which the customer can remove the cup 20. In the broken line position the retaining wall 67 closes the aperture 69. Thus at no time can a customer gain access to the inside of the apparatus via the dispensing aperture 69, it is thus difficult to pilfer from the vending apparatus 10.

A flat plate 67a is mounted at the free end of arm 67, such that in the broken line position, the plate 67a generally obturates the guide chute 19 to stop any cup 100 which has been accidently dispensed into the chute 19 from falling into the space 101 and spilling its contents. When the unit 21 returns to its solid line position the cup 100 will slide into recess 65.

As the shaft 27 rotates it also rotates a cam 30. Rotation of the cam 30 occurs in the direction shown in FIG. 10. A microswitch 70 is disposed in the path of the cam 30, such that a predetermined time after activation of the motor 26 the microswitch 70 is closed. Closure of the microswitch 70 allows current to be supplied to the coil 59 provided the control circuitry (described below) has made power available across the coil 59 in response to the customer pushing the 'sugar' button. Thus when the microswitch 70 is closed and power is available to the coil 59, sugar is supplied to the dispenser cup 15.

A second microswitch 71 is disposed in the path of the cam 30 such that at the end of one complete revolution of the cam 30, the microswitch 71, is closed. Closure of the microswitch 71 cuts off motors 24 and 26 from the power supply (not shown). The vending apparatus 10 is therefore deactivated until the next purchase.

It will be noted that as a result of this cut off mechanism, the turret 11 will only rotate whilst a cup 12 is being dispensed, thus when the turret 11 becomes totally empty it will only rotate during the dispensing of those cups 12 necessary for the level of cups 12 in the aperture 37 to drop to the second level.

Figure 13:
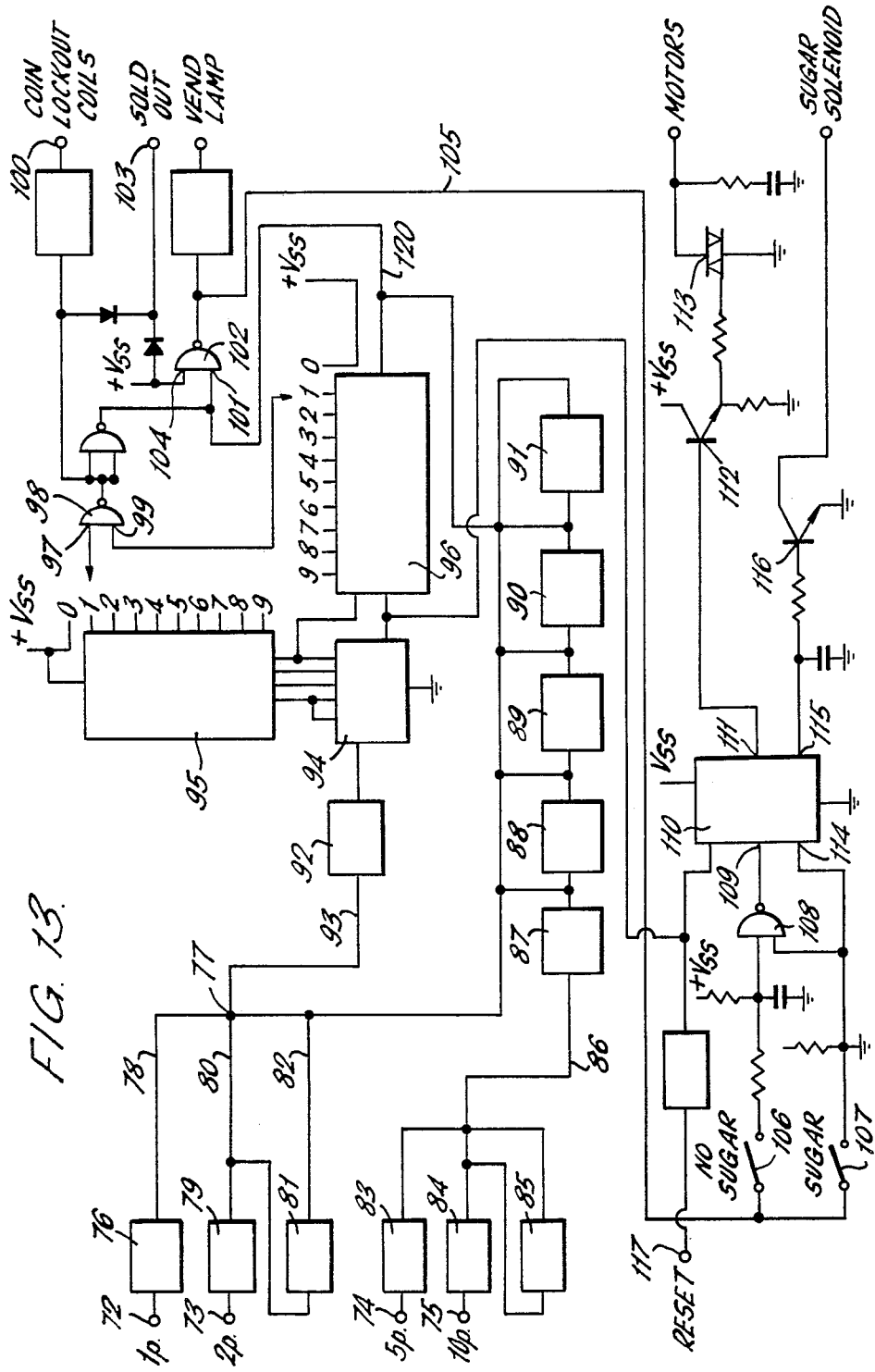
FIG. 13 is a circuit diagram of the control circuitry of the vending apparatus of FIG. 1.

FIG. 13 shows a part of the control circuitry of the vending apparatus 10. The vending apparatus 10 has four coin slots each corresponding to a particular coin value e.g. 1p, 2p, 5p, 10p. When a coin is placed in its respective slot, a microswitch (not shown) is closed and then opened causing a pulse to be supplied to a respective input 72 to 75.

When a 1p is received at input 72 a pulse generating circuit 76, which is connected to the input 72 generates a single count pulse in response to the leading edge of the microswitch or coin received pulse. The count pulse is then fed to a junction 77 along a line 78.

When a '2p' is received at input 72 it is fed to pulse generating circuit 79, which generates a single count pulse. This count pulse is fed to junction 77 along a line 80 and to a further pulse generating circuit 81, which generates a further count pulse, which is fed to the junction 77 along a line 82.

5p input 73 has a single pulse generating circuit 83 and 10p input 74 has two pulse generating circuits 84 and 85 which produce pulses in an identical manner to circuits 72 and 79 and 81 respectively. The pulse produced by circuits 83, 84 and 85 are fed along a line 86 to a chain of pulse generating circuits 87 to 91, the output of each of which is connected via a line 91a to junction 77. Thus for each single pulse generated by one of circuits 83, 84 and 85, five pulses reach junction 77.

It will be seen from the above that a pulse for each unit of currency paid into the machine is received at junction 77.

The pulses are fed from junction 77 to a further pulse generating circuit 92 along line 93, which generates a pulse for each pulse it receives.

The output pulses for circuit 92 are fed to a 'units' totaliser comprising circuits 94 and 95 and a 'tens' totaliser 96. As pulses are fed to the units totaliser an output appears at the output of a circuit 95, which corresponds to the instantaneous total of pulses received from circuit 92. When the tenth pulse is received an output appears on the '1' pin of circuit 95. The 'count' can continue until a total of 99 pence has been received.

One of the inputs (97) of a NAND gate 98 is connected to one of the outputs of circuit 94 and the other input 99 is connected to one output of circuit 95, such that a particular price for the coffee cup to be dispensed is chosen. In FIG. 13 the selected price is 11 pence. The 'cup price' can be varied by varying the outputs of circuit 94 and 95 to which inputs 97 and 99 are connected. If these inputs are connected to respective 0 output the apparatus 10 will operate on free vend.

When an output simultaneously appears on both of the selected price outputs NAND gate 97 will output.

This output causes coin lockout coils (not shown) to be energised, via output 100, such that the coin slots become obturate in a manner known per se.

The output of NAND gate 98 is also fed to one input 101 and further NAND gate 102, which outputs on receipt of output of gate 98, if the further level microswitch (not shown) is closed giving an input via SOLD OUT input 103 to the other input 104 of gate 102. The output of gate 102 lights the VEND LAMP and is also fed along line 105 to switches 106 and 107, which are operated by the NO SUGAR and SUGAR push buttons (not shown).

When there is an output on line 105 and switch 106 is closed by the customer, the output of gate 102 is fed via a NAND gate 108 to pin 109 of an integrated circuit 110, causing the integrated circuit 110 to output on pin 111 to "switch on" a transistor 112 and hence to switch on a thyristor 113. When thyristor 113 conducts power is supplied to motors 24 and 26.

When the customer closes switch 107 and there is an output on line 105, the output is fed both to pin 109 via NAND gate 108, causing power to be supplied to motors 24 and 26 and to pin 114 of integrated circuit 110, which causes an output on pin 115 of integrated circuit 110 to switch on transistor 116 causing power to be supplied to solenoid 59.

When microswitch 71 is closed by cam 30 a disable of reset signal is fed to RESET input 117, from which it is fed to integrated circuit 110 via pin 118, disabling the integrated circuit 110 and hence switching off transistors 112 and 116, and to totaliser units 94, 95 and 96 via line 119 resetting these units to zero. The apparatus 10 is then ready for its next sale.

It will be noted that the output of gate 98 is fed via line 120 to the totaliser unit 96 and pulse generating circuits 76, 79, 81, 83 to 85 and 87 to 91 to constitute an inhibit signal to inhibit the totalising of further pulses once the predetermined price has been reached.

Figure 14:
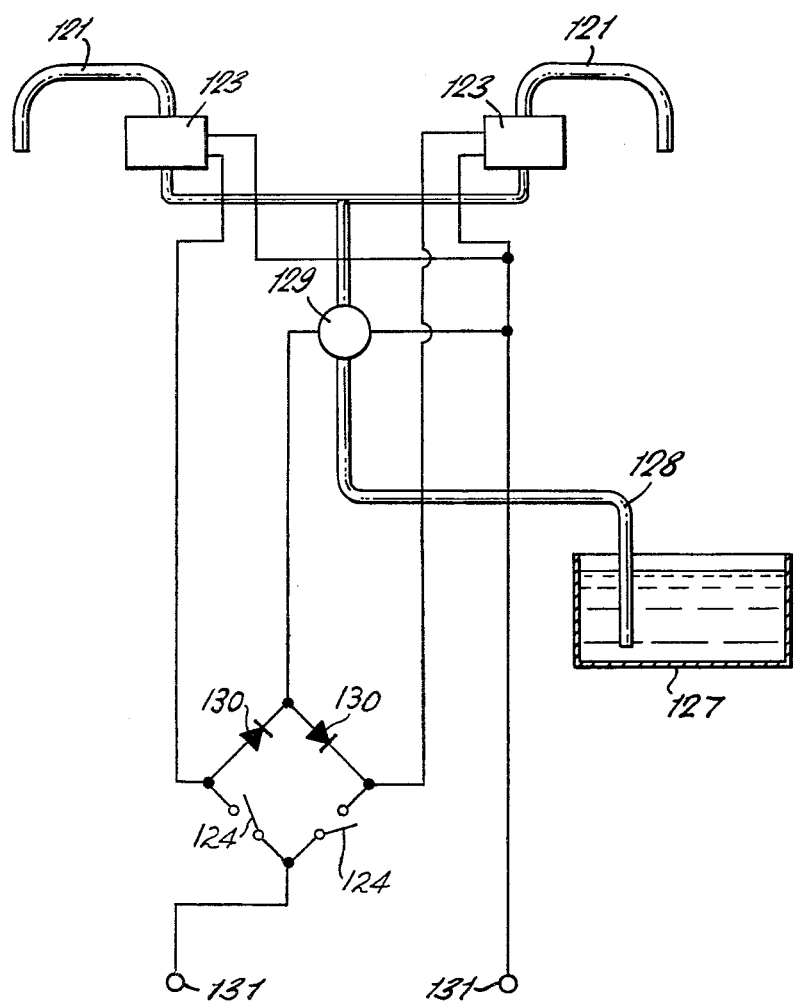
FIG. 14 is a schematic diagram of the water and electric circuits of the water supply apparatus of FIG. 2.

When the customer has obtained a cup with the appropriate dry ingredients in, he places it under a nozzle 121 (see FIGS. 2 and 2a) of water supply apparatus 122. Each nozzle 121 has a valve 123 which is controlled by a respective switch 124 (see FIG. 14), the operating element 125 of which is located in a recess 126 (See also FIG. 2a) and is operated by the customer pressing the rim of the cup 20 against the operating element 125 of the switch 124. Preferably water supply apparatus 122 is separate from the vending apparatus 10. However, if desired, it can be housed within the same body. It will be appreciated that the recesses 126 could be formed lower down and enlarged so that the operating elements 124 could be operated by the body of the cup 20.

Preferably water is fed from a reservoir 127 via a pipe 128 to the nozzles 121 by an electrically operated pump 129. In order to maintain a constant flow through each nozzle 121, whether or not the other nozzle is operated, each switch 124 is connected in series with a respective diode 130, the diodes being connected in parallel in front to back relationship, and the complete diode circuit being connected in series between inputs 131 and the pump 129. When one only of switches 124 is closed the supply to the motor is half-wave rectified and when both switches are closed the supply is full wave rectified. Thus the pump 129 is run at twice the speed when two nozzles 121 are being used as compared with when one is being used. In this way the flow rate through the nozzles 121 is maintained constant. It is desirable to maintain a constant flow rate as only a certain range of flow rates will satisfactorily dissolve the dried ingredient(s) or material in the cup.

It will be appreciated that the interrupting blade 16 may be formed with a flat upper face, in which case the cup 15 will be supported vertically and the sugar then passes over the edge of the cup 15 in the manner of a waterfall.

We claim:

1. A valve for controlling the dispensing of granular friable material from a hopper comprising: means defining a passageway for the material; a valve member having two angularly spaced valve elements; means for pivotably mounting the valve member on the means defining a passageway on one side of the passageway about an axis extending transversely to the passageway such that the two valve elements are spaced about the pivotal axis of the valve member; means for varying the cross-sectional area of the passageway upstream of the path of travel of the upstream element; and means defining a pair of oppositely facing valve seats spaced along the passageway; each of said seats at least partially surrounding the passageway, the upstream one of which faces upstream along the passageway and the downstream one of which faces downstream along the passageway, the elements being capable of alternately closing the passageway by engaging, in face to face relationship, a respective valve seat according to the rotational position of the valve member, so that, in use, with the downstream of the two elements closing the passageway by engaging the downstream valve seat a charge of the material in the hopper can be received between the two elements and so that when the valve member is rotated to open the passageway by the downstream element and subsequently close it by the upstream element engaging the upstream valve seat the charge of material can be dispensed, flow through the passageway being substantially obstructed by the upstream element as the valve member is returned to close the passageway by the downstream element.

2. A valve as claimed in claim 1 wherein the means for altering the cross-sectional area of the passageway comprises a plate slidably mounted for movement into and out of the passageway.

3. A valve as claimed in claim 2 wherein the end of the plate adjacent the passageway is notched.

4. Vending apparatus for vending a container comprising a body having a discharge point; and a delivery system for containers mounted in the body and comprising means for holding a generally vertically extending stack of containers, means disposed adjacent the lower end of the means for holding, for releasing containers, one by one, from the lower end of the stack, means disposed below the means for releasing, movable into and out of the path of travel of a released container for receiving a container falling from the stack to tilt temporarily the container at an angle to its path of travel, dispensing means mounted in the body to the side of the stack towards which the container is angled, for dispensing a charge of materials into the angled container and means to guide the container from the receiving means to the discharge point; the dispensing means comprising a hopper and a valve, which valve comprises; a valve member having jointly spaced valve elements; means for pivoting and mounting a valve member on the means defining a passageway on one side of the passageway about an axis extending transversely to the passageway such that the two valve elements are spaced around the pivotal axis of the valve member; and means defining a pair of oppositely facing valve seats spaced along the passageway, each of said seats at least partially surrounding the passageway, the upstream one of which faces upstream along the passageway and the downstream one of which faces downstream along the passageway, the elements being capable of alternately closing the passageway by engaging, in face to face relationship, a respective valve seat according to rotational position of the valve member, so that, in use, with the downstream of the two elements closing the passageway by engaging the downstream valve seat a charge of the material in the hopper can be received between the two elements and so that when the valve member is rotated to open the passageway by the downstream element and subsequently close it by the upstream element engaging the upstream valve seat, the charge of material can be dispensed, flow through the passageway being substantially obstructed by the upstream element as the valve member is returned to close the passageway by the downstream element.

5. Vending apparatus as claimed in claim 4 wherein there are a plurality of dispensing means for dispensing a charge of material into a temporarily supported container.

6. Vending apparatus as claimed in claim 4 wherein the apparatus is coin operated.

7. Vending apparatus as claimed in claim 4 further including means for instructing at least one of a container operation and the dispensing of material into the container.

8. Vending apparatus as claimed in claim 4 wherein the means movable into and out of the path of travel of a released container temporarily supports the container at an angle, to its path of travel, towards the dispensing means.

9. Vending apparatus as claimed in claim 8 in which the receiving means is arranged to successively orient the temporarily supported container towards such dispensing means.

10. Vending apparatus as claimed in claim 8 wherein the receiving means includes a blade reciprocally movable across the path of travel of a released container, the blade having a profile angled in sense to tilt the container.

11. Vending apparatus as claimed in claim 4 further including a water supply comprising a reservoir for water, two or more outlet nozzles, means for pumping water from the reservoir to each nozzle, valve means for each nozzle for opening and closing the respective nozzle, and means for varying the rate of pumping in accordance with the number of valve means which are open.

12. Vending apparatus as claimed in claim 11 wherein the means for pumping is electrically operated and wherein the means for varying the rate of pumping comprises means for varying the magnitude of the electrical power supplied to the means for pumping.

13. A vending apparatus as claimed in claim 12, wherein there are two nozzles and wherein the means for varying the magnitude of the electrical power supplied to the means for pumping comprises a pair of diodes connected in parallel front to back relationship and in series with the means for pumping and a power input and each being connected in series with a respective one of the switches.

14. Vending apparatus as claimed in claim 4 wherein the body defines an aperture at the discharge point and wherein the apparatus further includes discharge means for discharging containers, through the aperture, from the inside of the body of the vending apparatus, the means for discharging comprising a member, means for rotatably mounting the member to the body in the aperture thereof about an axis of rotation, the member having two elements spaced apart around the axis of rotation and being rotatable, in use, between a first position in which one element closes the aperture and the other element lies inside the body and a second position in which the other element closes the aperture, the other element being formed with container retaining means for receiving a container in the first position and for rendering the container accessible to a customer in the second position.

15. Vending apparatus as claimed in claim 14 wherein the other element is formed with a projection for obturating the means for guiding a container when the other element is in its second position.

16. Vending apparatus as claimed in claim 14 further including a water supply comprising a reservoir for water, two or more outlet nozzles means for pumping water from the reservoir to each nozzle, valve means for each nozzle for opening and closing the respective nozzles, and means for varying the rate of pumping in accordance with the number of valve means which are open.

17. Vending apparatus as claimed in claim 16 wherein the or each valve means is operable by an electrical switch having an operating element, each operating element being disposed adjacent the outlet end of its respective nozzle in a recess formed in the body of the apparatus such that the switch can be operated, in use, by pressure transmitted through a container being filled.

18. Vending apparatus as claimed in claim 17 wherein the means for pumping is electrically operated and wherein the means for varying the rate of pumping comprises means for varying the magnitude of the electrical power supplied to the means for pumping.

19. A vending apparatus as claimed in claim 18, wherein there are two nozzles and wherein the means for varying the magnitude of the electrical power supplied to the means for pumping comprises a pair of diodes connected in parallel front to back relationship and in series with the means for pumping and power input and each being connected in series with a respective one of the switches.

* * * * *